(12) United States Patent
Sato et al.

(10) Patent No.: US 8,712,623 B2
(45) Date of Patent: Apr. 29, 2014

(54) CONTROL APPARATUS FOR AUTONOMOUS OPERATING VEHICLE

(75) Inventors: Kazuhisa Sato, Wako (JP); Makoto Yamamura, Wako (JP); Yoshinori Masubuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 13/240,966

(22) Filed: Sep. 22, 2011

(65) Prior Publication Data

US 2012/0083962 A1 Apr. 5, 2012

(30) Foreign Application Priority Data

Sep. 30, 2010 (JP) ................................ 2010-222640

(51) Int. Cl.
*G01C 22/00* (2006.01)
*G05D 1/00* (2006.01)

(52) U.S. Cl.
USPC ............................... 701/25; 702/92; 700/253

(58) Field of Classification Search
USPC ................ 701/23, 25, 425, 468, 50, 533, 26; 15/319; 180/168; 318/580; 700/245, 700/253, 258, 56; 702/150, 92
See application file for complete search history.

(56) References Cited

U.S. PATENT DOCUMENTS

| 5,938,704 | A  | * | 8/1999 | Torii ............................... 701/23 |
| 6,907,336 | B2 | * | 6/2005 | Gray et al. ...................... 701/50 |
| 6,984,952 | B2 | * | 1/2006 | Peless et al. ................... 318/580 |
| 2005/0096790 | A1 | * | 5/2005 | Tamura et al. ................. 700/245 |
| 2007/0150109 | A1 |   | 6/2007 | Peless et al. |

FOREIGN PATENT DOCUMENTS

| GB | 2 307 062 A | 5/1997 |
| JP | 60-239812 A | 11/1985 |
| JP | 8-286738 A | 11/1996 |
| JP | 3467136 B2 | 11/2003 |

* cited by examiner

*Primary Examiner* — Tuan C. To
*Assistant Examiner* — Isaac Smith
(74) *Attorney, Agent, or Firm* — Arent Fox LLP

(57) ABSTRACT

In an apparatus for controlling an autonomous operating vehicle having a prime mover and operating machine, it is configured to have a geomagnetic sensor responsive to magnets embedded in the area, detect angular velocity generated about z-axis in center of gravity of the vehicle, detect a wheel speed of the driven wheel, store map information including magnet embedded positions, detect a primary reference direction, detect a vehicle position relative to the magnet, and detect a vehicle position in the area, calculate a traveling direction and traveled distance of the vehicle, and control the operation performed through the operating machine in the area in accordance with a preset operation program based on the detected direction, the detected position of the vehicle in the area, the calculated traveling direction and the calculated traveled distance.

27 Claims, 14 Drawing Sheets

CONTROL APPARATUS FOR AUTONOMOUS OPERATING VEHICLE

BACKGROUND

1. Technical Field

The invention relates to a control apparatus for an autonomous operating vehicle, particularly to a control apparatus for a vehicle that autonomously travels to perform work or operation, e.g., mow lawn.

2. Background Art

In an autonomous operating vehicle that autonomously travels to perform work or operation such as mowing lawn in a defined operating (travel-scheduled) area it is necessary to detect a border of the area. Therefore, magnets are embedded on the border and a sensor sensing the magnets is mounted on the vehicle to detect the border, as taught, for example, by Japanese Laid-Open Patent Application No. Sho 60(1985)-239812 ('812).

Japanese Laid-Open Patent Application No. Hei 8(1996)-286738 ('738) discloses a technique to embed an electric wire along the border and detect generated magnetic field by a sensor mounted on an operating vehicle, thereby detecting the border. Further, Japanese Patent No. 3467136 ('136) proposes a technique to detect a position of an operating vehicle using GPS signals in addition to the foregoing magnetic induction techniques.

SUMMARY

Although the techniques in '812 and '738 enable to detect the border of the travel-scheduled area, it is preferable to additionally detect a position of the operating vehicle in the detected area for improving the work efficiency. Although the GPS signal is used in '136 to deal with it, it makes the structure complicated and may lead to the increase in cost, disadvantageously.

An object of the invention is therefore to overcome the foregoing drawback by providing an apparatus for controlling an autonomous operating vehicle that can detect a border of an operating (travel-scheduled) area and a position of the vehicle in the area with the simple structure.

In order to achieve the object, the invention provides in the first aspect an apparatus for controlling an autonomous operating vehicle having a prime mover, a driven wheel connected to the prime mover and an operating machine, the vehicle autonomously traveling in a travel-scheduled area to perform operation using the operating machine by driving the prime mover, comprising: a geomagnetic sensor having x-axis, y-axis and z-axis outputs, mounted on the vehicle and responsive to a magnet embedded in the travel-scheduled area; an angular velocity sensor adapted to detect angular velocity generated about z-axis in center of gravity of the vehicle; a wheel speed sensor adapted to produce an output indicative of a wheel speed of the driven wheel of the vehicle; a map information storage adapted to define the travel-scheduled area and store map information including an embedded position of the magnet indicated with an x-y coordinate position; a primary reference direction and position detector adapted to detect a primary reference direction based on the output of the geomagnetic sensor, detect a position of the vehicle relative to the magnet based on the output of the geomagnetic sensor and detect a position of the vehicle in the travel-scheduled area based on the detected position and the map information; a direction and distance calculator adapted to calculate a traveling direction based on the output of the angular velocity sensor and calculate a traveled distance based on the output of the wheel speed sensor; and an operation controller adapted to control the operation performed through the operating machine in the travel-scheduled area in accordance with a preset operation program based on the detected primary reference direction, the detected position of the vehicle in the travel-scheduled area, the calculated traveling direction and the calculated traveled distance.

In order to achieve the object, the invention provides in the second aspect a method for controlling an autonomous operating vehicle having a prime mover, a driven wheel connected to the prime mover and an operating machine, the vehicle autonomously traveling in a travel-scheduled area to perform operation using the operating machine by driving the prime mover, and further having a geomagnetic sensor having x-axis, y-axis and z-axis outputs, mounted on the vehicle and responsive to a magnet embedded in the travel-scheduled area, an angular velocity sensor adapted to detect angular velocity generated about z-axis in center of gravity of the vehicle, a wheel speed sensor adapted to produce an output indicative of a wheel speed of the driven wheel of the vehicle and a map information storage adapted to define the travel-scheduled area and store map information including an embedded position of the magnet indicated with an x-y coordinate position, comprising the steps of: detecting a primary reference direction based on the output of the geomagnetic sensor, detecting a position of the vehicle relative to the magnet based on the output of the geomagnetic sensor and detecting a position of the vehicle in the travel-scheduled area based on the detected position and the map information; calculating a traveling direction based on the output of the angular velocity sensor and calculating a traveled distance based on the output of the wheel speed sensor; and controlling the operation performed through the operating machine in the travel-scheduled area in accordance with a preset operation program based on the detected primary reference direction, the detected position of the vehicle in the travel-scheduled area, the calculated traveling direction and the calculated traveled distance.

BRIEF DESCRIPTION OF DRAWINGS

The above and other objects and advantages will be more apparent from the following description and drawings in which.

DESCRIPTION OF EMBODIMENTS

A control apparatus for an autonomous operating vehicle according to embodiments of the invention will now be explained with reference to the attached drawings.

Figure 1:
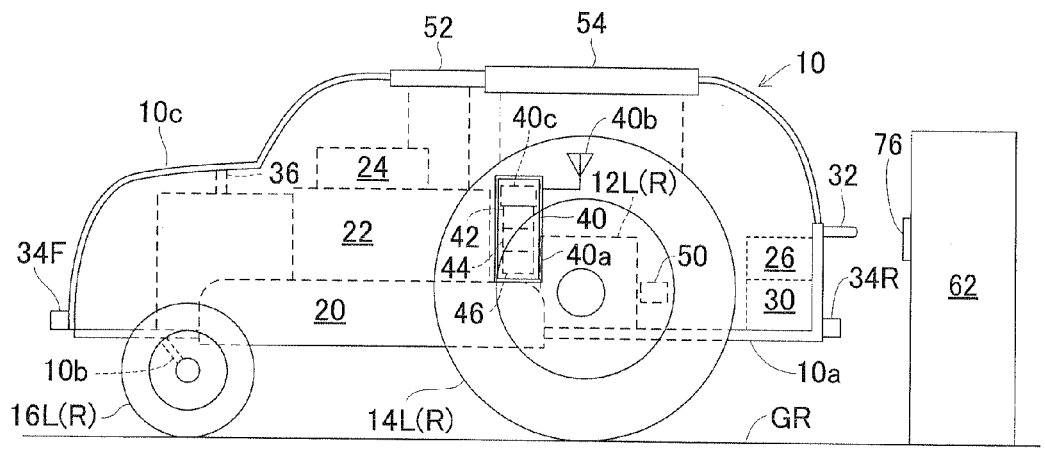
FIG. 1 is an overall schematic view of a control apparatus for an autonomous operating vehicle according to a first embodiment of the invention.
Figure 2:
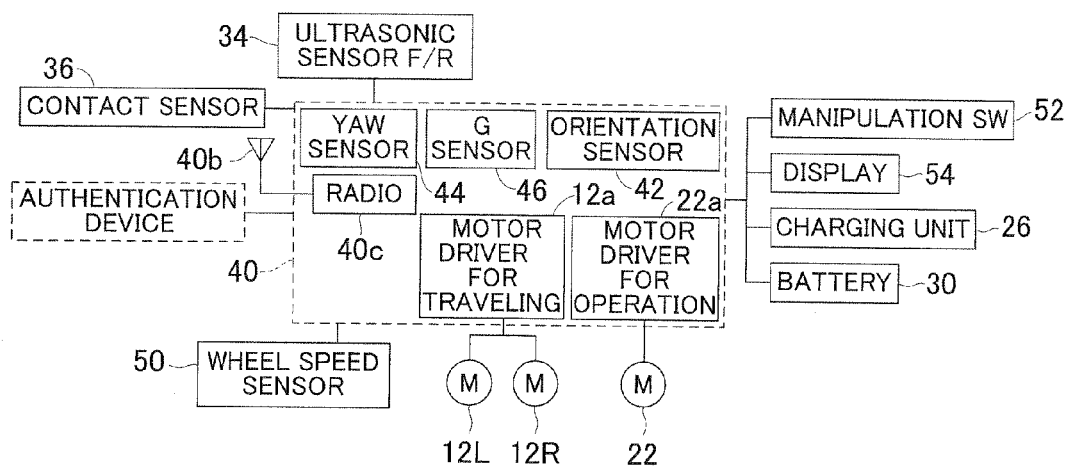
FIG. 2 is a block diagram showing input and output of sensors, an electronic control unit (ECU), electric motors (prime movers), etc., mounted on the vehicle shown in FIG. 1.
Figure 3:
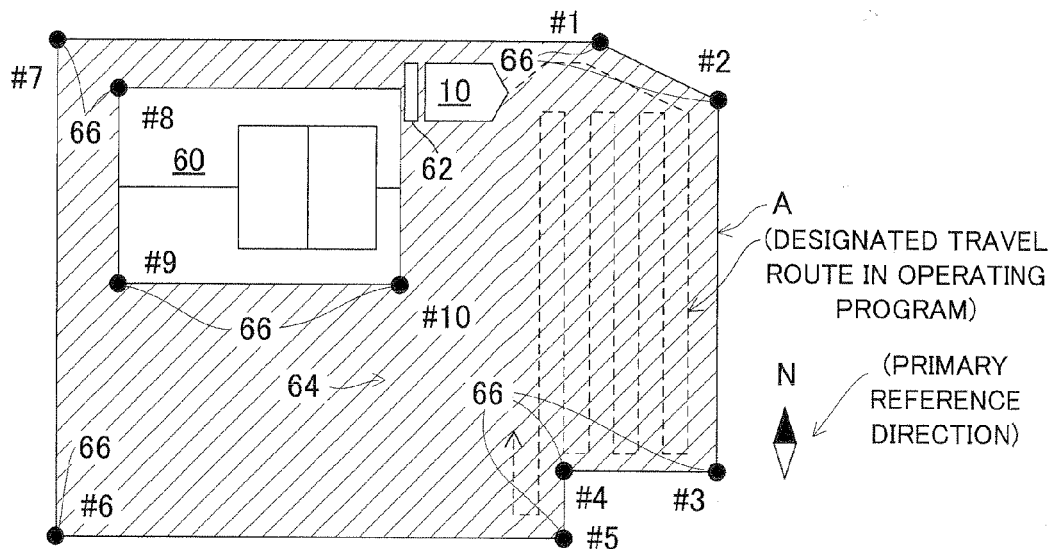
FIG. 3 is a plan view showing a travel-scheduled area where the vehicle of FIG. 1 is to be traveled.
Figure 4:
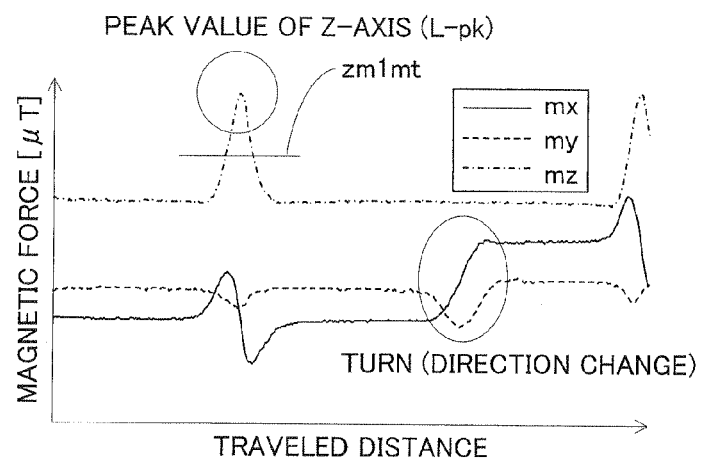
FIG. 4 is a waveform diagram showing triaxial outputs of an orientation sensor (geomagnetic sensor) installed in the vehicle shown in FIG. 1.
Figure 5:
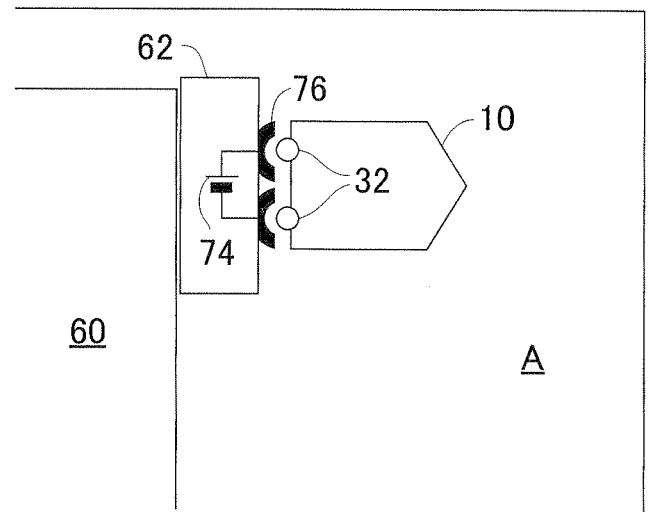
FIG. 5 is an explanatory view showing charging operation at a charge station (ST) shown in FIG. 1.
Figure 6:
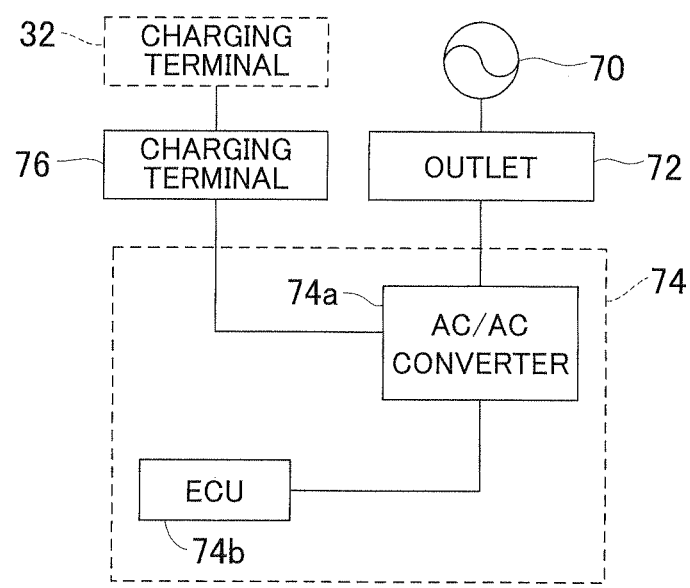
FIG. 6 is a block diagram showing the configuration of the charge ST shown in FIG. 5.
Figure 7:
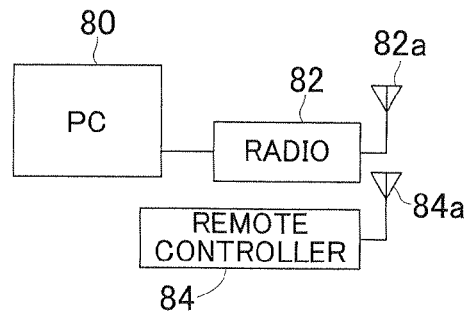
FIG. 7 is a block diagram showing the configuration of manipulation equipment used by an operator for the vehicle shown in FIG. 1.
Figure 8:
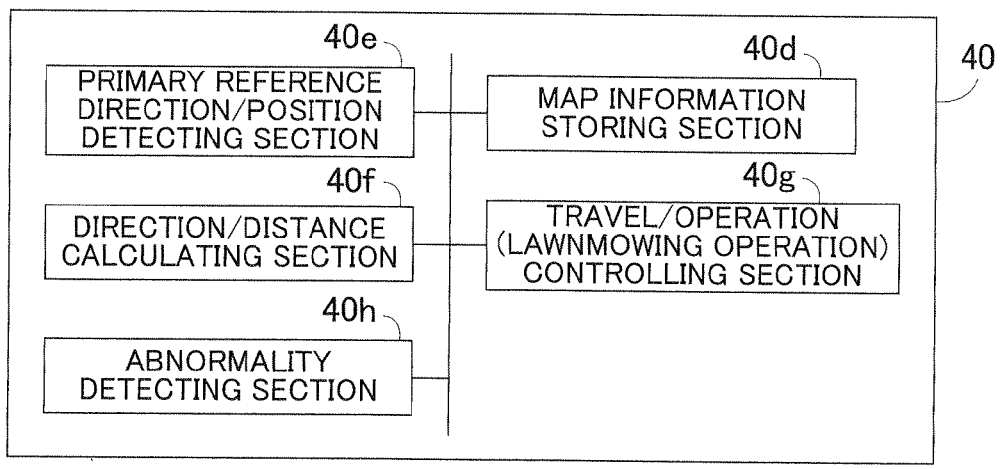
FIG. 8 is a block diagram functionally showing the operation of the apparatus (ECU) shown in FIG. 2.
Figure 9:
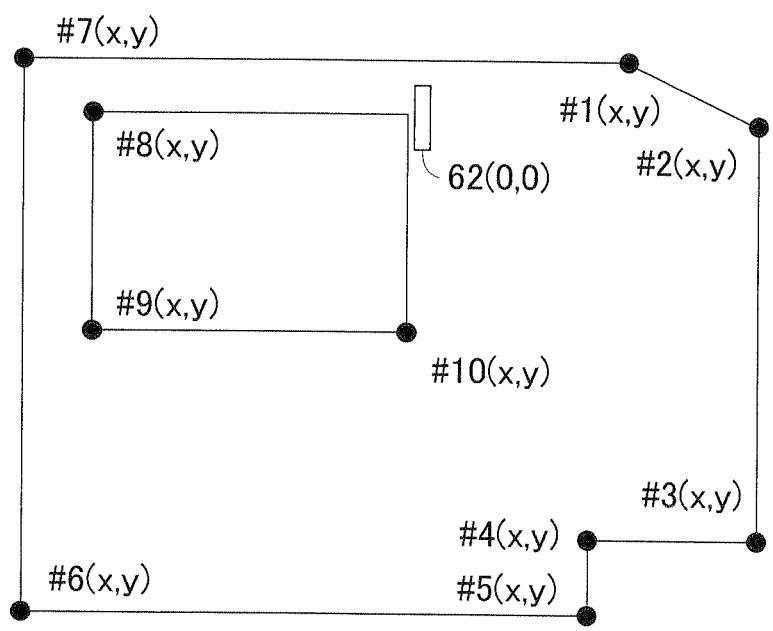
FIG. 9 is an explanatory view of map information shown in FIG. 8.

FIG. 1 is an overall schematic view of a control apparatus for an autonomous operating vehicle according to a first embodiment of the invention, FIG. 2 is a block diagram showing input and output of sensors, an electronic control unit (ECU), electric motors (prime movers), etc., mounted on the vehicle, FIG. 3 is a plan view showing an operating (travel-scheduled) area where the vehicle of FIG. 1 is to be traveled, FIG. 4 is a waveform diagram showing triaxial outputs of an orientation sensor (geomagnetic sensor) shown in FIG. 1, FIG. 5 is an explanatory view showing charging operation at a charge station shown in FIG. 1, FIG. 6 is a block diagram showing the configuration of the charge station shown in FIG. 5, FIG. 7 is a block diagram showing the configuration of manipulation equipment used by an operator for the vehicle shown in FIG. 1, FIG. 8 is a block diagram functionally showing the operation of the apparatus (ECU) shown in FIG. 2 and FIG. 9 is an explanatory view of map information shown in FIG. 8.

In FIG. 1, symbol 10 indicates an autonomous operating vehicle. As shown in FIGS. 1 and 2, the vehicle 10 is installed with electric motors (prime movers) 12R, 12L for traveling.

The motors 12R, 12L are connected to right and left driven wheels 14R, 14L (only the left side shown) attached on the rear side of a chassis 10a of the vehicle 10 and rotates the driven wheels 14R, 14L in the normal (forward traveling) direction or reverse (backward traveling) direction independently of each other.

Right and left free wheels 16R, 16L (only the left side shown) are attached on the front side of the chassis 10a of the vehicle 10 through a stay 10b. Blades (rotary blades; operating machine) 20 for mowing lawn are attached in the center or thereabout of the chassis 10a.

The blades 20 are connected to an electric motor 22 for operation to be rotated thereby, and also connected to a blade height adjustment mechanism 24 that can be manually operated by an operator (user).

The blade height adjustment mechanism 24 is equipped with screws (not shown) to be manually turned by the operator for adjusting the height of the blades 20 from a contact ground GR. The chassis 10a is attached with a body frame 10c that covers the motors 12, 22, blades 20 and the like.

A charging unit (including an AC/DC converter) 26 and a battery 30 are accommodated at the rear of the vehicle 10 and two charging terminals 32 (later shown in FIG. 5) are attached to the frame 10c to protrude backward.

The terminals 32 are connected to the charging unit 26 and the charging unit 26 is connected to the battery 30 through wiring (not shown). The battery 30 is connected to the motors 12, 22 through wiring (not shown).

Thus the vehicle 10 comprises a four-wheel, unmanned, electric lawn-mower vehicle that is, for instance, about 500 millimeters long, 300 millimeters wide and 300 millimeters high and configured to travel within an operating (travel-scheduled) area A shown in FIG. 3.

Returning to the explanation on FIG. 1, the front and rear ends of the vehicle 10 are attached with ultrasonic sensors 34F, 34R for detecting an obstacle and the frame 10c is attached with a contact sensor 36. When the frame 10c comes off from the chassis 10a upon having contact with an obstacle and such, the contact sensor 36 outputs an ON signal.

An electronic control unit (ECU) 40 is installed in the center or thereabout of the vehicle 10, more specifically, on a printed-circuit board housed in an ECU housing box 40a. The ECU 40 includes a microcomputer having a CPU, ROM, RAM, I/Os, etc.

An orientation sensor 42 is installed on the board in the ECU housing box 40a in the vicinity of the ECU 40 and generates an output or signal indicative of the primary reference direction on the earth, i.e., the north. As shown in FIG. 4, the orientation sensor 42 comprises a triaxial geomagnetic sensor having outputs mx, my and mz in directions of three axes x, y and z. In FIG. 3, x indicates a traveling direction of the vehicle 10, y a sideways direction perpendicular to the direction of x, and z a gravitational direction (direction penetrating the plane of paper) perpendicular to the directions of x and y.

The board in the ECU housing box 40a is also installed near the orientation sensor 42 with a Yaw sensor (angular velocity sensor) 44 that (detects and) produces an output or signal indicative of angular velocity (yaw rate) generated about the z-axis in the center of gravity of the vehicle 10 and with a G sensor (acceleration sensor) 46 that (detects and) produces an output or signal indicative of the longitudinal (traveling) direction acceleration G acting on the vehicle 10.

A wheel speed sensor 50 is installed near the driven wheel 14 to (detect and) produce an output or signal representing wheel speed thereof. A manipulation switch (emergency stop switch) 52 is disposed in the vehicle 10 to be manipulatable by the operator, so that the vehicle 10 is stopped traveling when the switch 52 is turned ON by the operator.

The outputs of the foregoing ultrasonic sensors 34, contact sensor 36, orientation sensor 42, Yaw sensor 44, G sensor 46, wheel speed sensor 50 and manipulation switch 52 are sent to the ECU 40.

The upper surface of the frame 10c of the vehicle 10 is widely cut away and a display 54 is installed therein. The display 54 is connected to the ECU 40 to show an operation mode, etc., in response to a command sent from the ECU 40.

A receiving antenna 40b is attached to the ECU housing box 40a and a radio 40c connected to the antenna 40b is installed on the board in the ECU housing box 40a. The ECU 40 is connectable with an antitheft authentication device or the like.

The explanation on the travel-scheduled area A shown in FIG. 3 will be made. As shown, the travel-scheduled area A has a substantially rectangular shape and a house 60, charge station (ST) 62, operating area 64, etc., are arranged therein Magnetic nails (magnets) 66 are embedded on a border of the travel-scheduled area A and around the house 60.

The magnetic nails 66 are composed of permanent magnets, such as ferrite for example. Ten magnetic nails 66 of #1 to #10 are embedded on the border of the travel-scheduled area A and the border of the house 60, as illustrated. Since the orientation sensor 42 comprises the geomagnetic sensor, it is responsive to the magnetic nails 66.

As mentioned, the charge ST 62 is provided in the travel-scheduled area A so that, as shown in FIG. 5, the vehicle 10 can be stopped and connected to the charge ST 62 through the charging terminals 32 to be charged thereby. The charge ST 62 is equipped with a charging device 74 connected to the commercial power source 70 through an electric outlet 72.

The charging device 74 has an AC/AC converter 74a and an electronic control unit (ECU) 74b controlling the operation of the AC/AC converter 74a, and is connectable to the charging terminals 32 through charging terminals 76.

Specifically, the voltage of the alternating current coming from the commercial power source 70 through the outlet 72 is appropriately stepped down by the AC/AC converter 74a and, when the vehicle 10 is connected to the charge ST 62 through the charging terminals 32 and 76, the alternating current is supplied to the vehicle 10 and stored in the battery 30 through the charging unit 26.

Manipulation equipment to be used by the operator for manipulating the vehicle 10 includes a personal computer 80, a radio 82 connected thereto and a remote controller 84, as shown in FIG. 7. The radio 82 and remote controller 84 have transmitting antennas 82a, 84a, respectively, so that they can send operation commands to the ECU 40 through the receiving antenna 40b and radio 40c in the vehicle 10.

As shown in FIG. 8, the ECU 40 has a map information storing section 40d that defines or specifies the travel-scheduled area A and stores map information including embedded positions of the magnetic nails 66, etc., indicated with x-y coordinate positions; a primary reference direction and position detecting section 40e that detects a primary reference direction based on the output of the orientation sensor 42, detects a position of the vehicle 10 relative to a specific one of the magnetic nails 66 based on the output of the orientation sensor 42 and detects a position of the vehicle 10 in the travel-scheduled area A based on the detected position and the map information; a direction and distance calculating section 40f that calculates a traveling direction in which the vehicle 10 travels based on the output of the Yaw sensor 44 (and an output of the G sensor 46) and calculates a traveled distance of the vehicle 10 based on the output of the wheel speed sensor 50; a travel and operation (lawnmowing operation) controlling section 40g that controls the operation performed using the blades 20 (operating machine) in the travel-scheduled area A in accordance with a preset operation program based on the detected primary reference direction, the detected position of the vehicle 10 in the travel-scheduled area A, the calculated traveling direction and the calculated traveled distance; and an abnormality detecting section 40h that detects an abnormality based on the outputs of the ultrasonic sensors 34 and contact sensor 36. FIG. 9 is an explanatory view of the map information stored in the map information storing section 40d.

To be more specific, the direction and distance calculating section 40f calculates the traveling direction based on the angular velocity detected by the Yaw sensor 44 and corrects the calculated traveling direction with the output of the G sensor 46 as necessary.

The travel and operation controlling section 40g controls the operation of the motors 12 and motor 22 through a motor driver 12a and motor driver 22a, thereby controlling the travel of the vehicle 10. When an abnormality is detected by the abnormality detecting section 40h or when the manipulation switch 52 is turned ON, the travel and operation controlling section 40g stops the vehicle's traveling.

Figure 10:
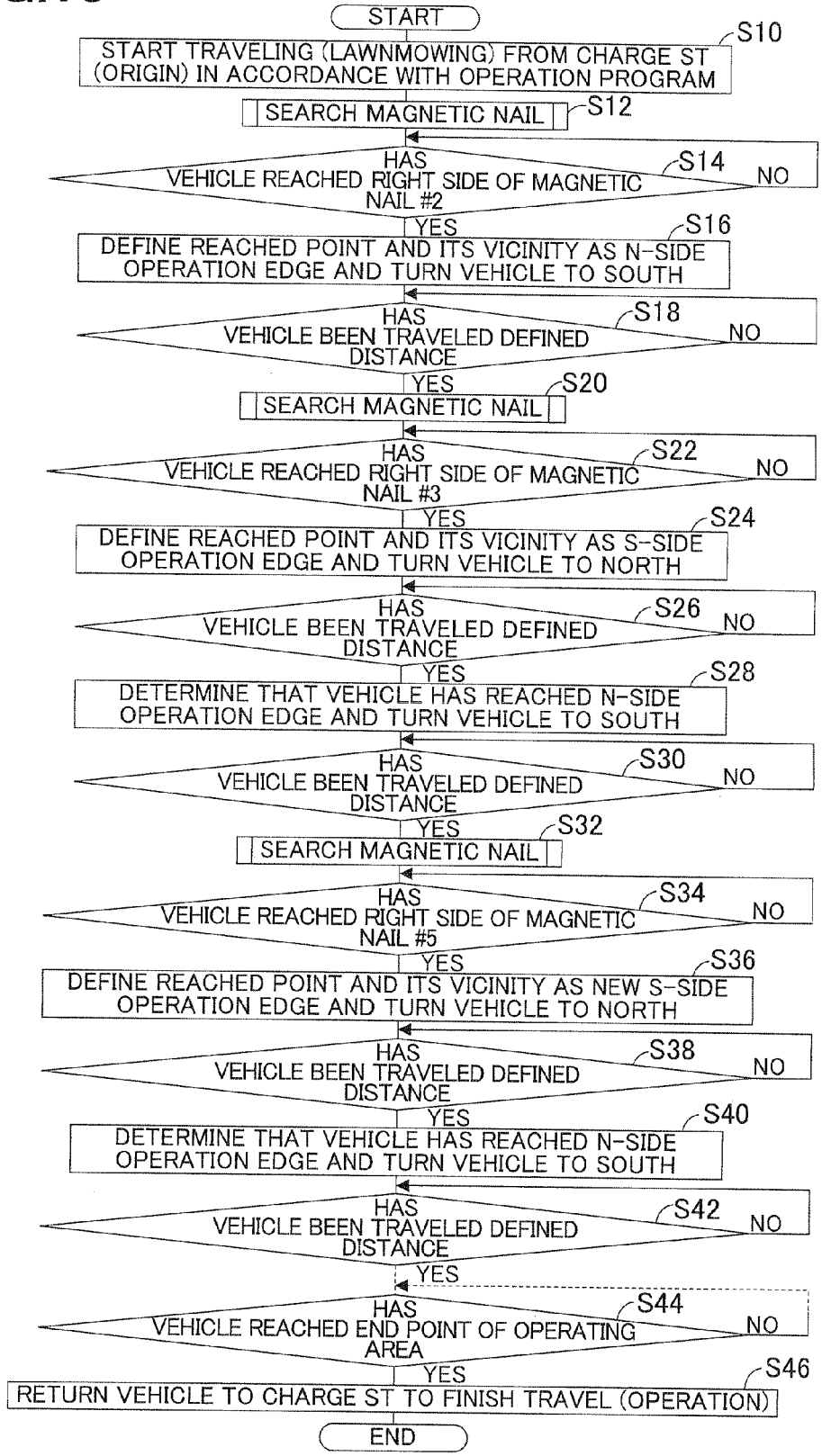
FIG. 10 is a flowchart showing the operation of the apparatus shown in FIG. 1.

FIG. 10 is a flowchart showing the foregoing operation of the ECU 40.

The program begins at S10, in which the travel (lawnmowing operation) of the vehicle 10 is started from the charge ST 62 in accordance with the preset operation program. As shown in FIG. 9, the coordinate position of the charge ST 62 is defined as the origin (0, 0), i.e., the reference position.

The preset operation program is set so that the vehicle 10 is traveled straight in the direction of the detected primary reference direction, i.e., in the north-south direction, along a designated travel route set in the operating area 64 of the travel-scheduled area A.

Note that, before the operation of the FIG. 10 flowchart is performed, the height of the blades 20 is manually adjusted through the blade height adjustment mechanism 24 by the operator depending on the degree of growth of the lawn in the operating area.

Next, the program proceeds to S12, in which a specific one of the magnetic nails 66 is searched.

Figure 11:
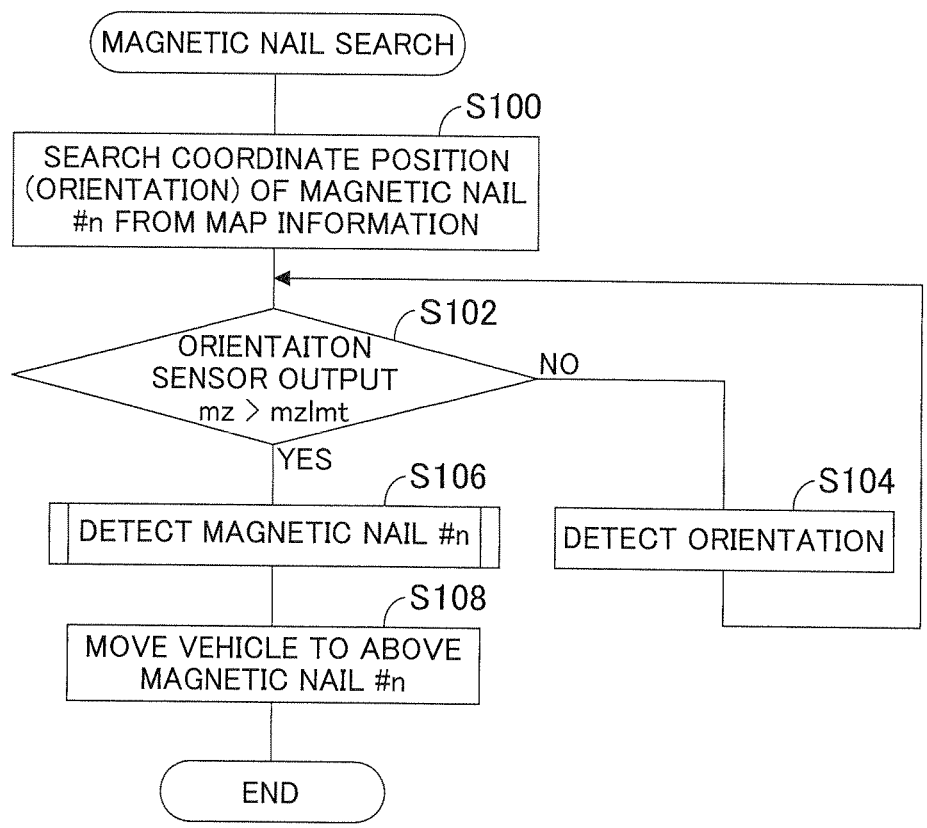
FIG. 11 is a subroutine flowchart showing the processing of magnetic nail (magnet) search of the FIG. 10 flowchart.

FIG. 11 is a subroutine flowchart showing the operation.

In S100, a coordinate position (orientation) of a second one of the magnetic nails 66, i.e., the magnetic nail #2 located at the end of the designated travel route is searched from the map information.

Next the program proceeds to S102, in which it is determined whether the z-axis output mz of the orientation sensor 42 exceeds a threshold value mzlmt. Here, it should be noted that the z-axis output mz of the orientation sensor 42 is configured to be generated in the minus direction in this embodiment.

Before continuing the explanation on FIG. 11, the characteristics of this embodiment are explained with reference to FIGS. 4 and 12. In this embodiment, the ECU 40 detects the primary reference direction based on the output of the orientation sensor 42, detects a position of the vehicle 10 relative to each of the magnetic nails 66 based on the output of the orientation sensor 42, and detects a position (absolute position) of the vehicle 10 in the travel-scheduled area A based on the detected position and map information. The term of "absolute position" means a position of the vehicle 10 indicated solely with the coordinate position in the travel-scheduled area A.

Specifically, as shown in FIG. 4, the x-axis and y-axis outputs mx, my of the orientation sensor 42 are greatly changed depending on the direction (turning) of the vehicle 10. However, although the z-axis output mz is somewhat influenced by a slope in the travel-scheduled area A, the z-axis output mz is apparently not changed depending on the direction (turning) of the vehicle 10. Since magnets having relatively strong magnetic forces are employed as the magnetic nails 66, the embedded positions of the magnetic nails 66 can be detected.

Figure 12:
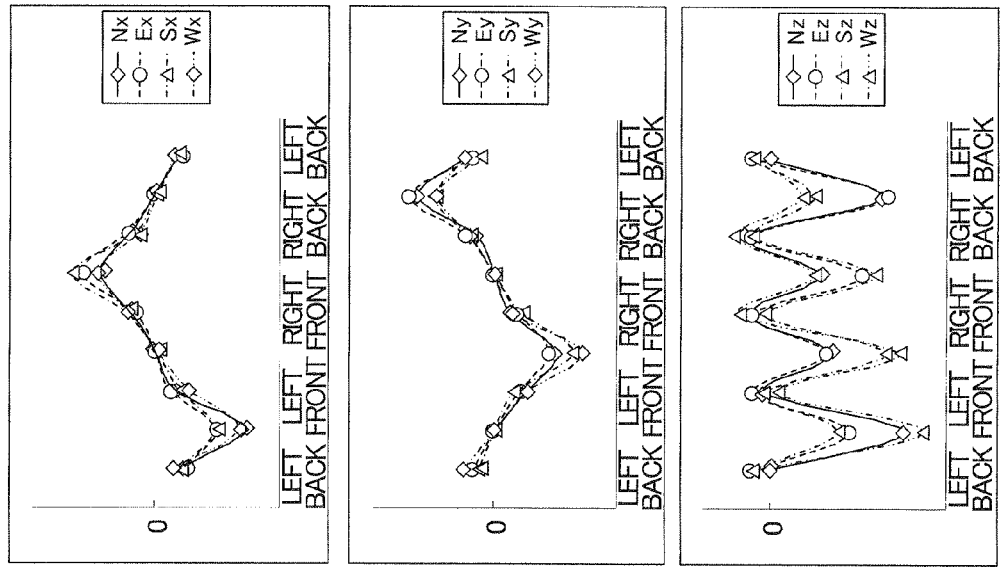
FIG. 12 is a set of explanatory views showing the positional relationship between the vehicle and one of magnetic nails (magnets) detected by the apparatus shown in FIG. 1.

More specifically, drawing on accumulated knowledge of the inventors, as shown in FIGS. 4 and 12, it is found out that, when an L-pk (a peak of the sensor output in the minus direction) of the z-axis output mz appears, based on the behavior of the x-axis and y-axis outputs mx, my, an approach direction of the vehicle 10 to the specific magnetic nail 66 (a position relative to the magnetic nail 66) can be detected.

Precisely, the inventors found out that it is possible to detect the approach direction of the vehicle 10 to the magnetic nail 66 by, upon appearance of the L-pk of the output mz, searching the peaks, increases and decreases of the x-axis and y-axis outputs. The knowledge of found results is shown in FIG. 12.

FIG. 12A is an explanatory view showing the x-axis, y-axis and z-axis outputs with respect to north, south, east and west relative to approach directions (positions) of the vehicle 10 to the magnetic nail 66 and FIG. 12B is an explanatory view showing the approach directions (positions) of the vehicle 10 to the magnetic nail 66. In FIG. 12B, L-pk indicates a peak of the sensor output in the minus direction, U-pk a peak of the sensor output in the plus direction, Up an increase in the sensor output and Down a decrease in the sensor output. The time when the L-pk or U-pk (peak) appears corresponds to the time when the vehicle 10 approaches the magnetic nail 66 the most.

As shown in FIG. 4, the threshold value mzlmt is set to a value which enables to determine that the L-pk of the mz output of the orientation sensor 42 appears.

In the FIG. 11 flowchart, when the result in S102 is negative, the program proceeds to S104, in which based on the output of the orientation sensor 42 (and the output of the G sensor 46), the primary reference direction (north) is detected using a known method.

Then the program returns to S102 to repeat the above processing as long as its result is negative, while when the result of S102 is affirmative, the program proceeds to S106, in which the specific magnetic nail 66 (#n) is detected.

Figure 13:
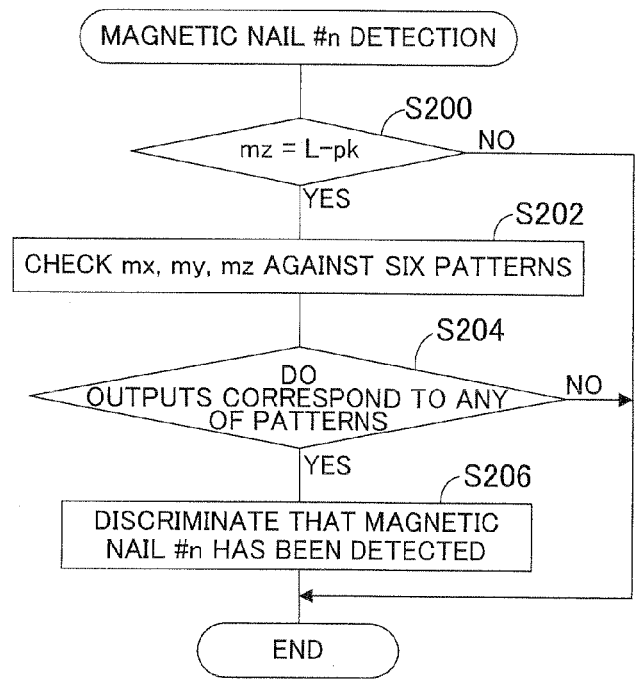
FIG. 13 is a subroutine flowchart showing the processing of magnetic nail (magnet) detection of the FIG. 11 flowchart.

FIG. 13 is a subroutine flowchart showing the operation.

In S200, it is determined whether the z-axis output mz of the orientation sensor 42 is (substantially) equal to the L-pk (shown in FIG. 4).

When the result in S200 is negative, the remaining steps are skipped and when the result is affirmative, the program proceeds to S202, in which the x-axis, y-axis and z-axis outputs mx, my and mz of the orientation sensor 42 are checked against six patterns shown in FIG. 12B.

Then the program proceeds to S204, in which it is determined whether the outputs of the orientation sensor 42 correspond to any of the six patterns.

When the result in S204 is negative, the remaining steps are skipped while when the result is affirmative, the program proceeds to S206, in which it is discriminated that the magnetic nail #n (magnetic nail #2 in this case) has been detected, i.e., that the position of the vehicle 10 in the travel-scheduled area A has been detected through the detection of the approach direction to the magnetic nail #n.

Returning to the explanation on the FIG. 11 flowchart, the program proceeds to S108, in which the vehicle 10 is moved (or traveled) to above the detected magnetic nail #n (#2). Specifically, the vehicle 10 is moved to above the appropriate magnetic nail 66 so that the position of the vehicle 10 in the travel-scheduled area A is calibrated. In the case where the vehicle 10 is already located above the detected magnetic nail #n, the processing of S108 is omitted.

Returning to the explanation on the FIG. 10 flowchart, the program proceeds to S14, in which the vehicle 10 is slightly moved to the right side of the magnetic nail #2. When the arrival at that position is confirmed, the program proceeds to S16, in which the point the vehicle 10 is located, including around the point, is defined as an N-side operation edge and the vehicle 10 is turned to the south and traveled straight.

The control of the motor 22 of the vehicle 10 is explained. Since the right and left driven wheels 14R, 14L are configured so that they can be driven to rotate in the normal and reverse directions through the right and left motors 22R, 22L independently or separately from each other. Consequently, when the motors 22R, 22L are rotated in the normal direction at the same speed, the vehicle 10 is traveled straight, whilst when they are rotated in the normal direction at the different speed, the vehicle 10 is turned to a side of lower rotational speed.

When one of the motors 22R, 22L is rotated in the normal direction and the other is rotated in the reverse direction, since the driven wheels 14R, 14L are rotated in the same directions as the associated motor's rotation, the vehicle 10 is turned at the position (which is so-called pivot turn).

Next the program proceeds to S18, in which based on the calculated traveled distance, it is determined whether the vehicle 10 has been traveled a distance defined in the operating program. When the result in S18 is affirmative, the program proceeds to S20, in which another magnetic nail 66 designated by #3 in FIG. 3 is searched.

The program proceeds to S22, in which it is confirmed that the vehicle 10 has reached (or passed) the right side of the magnetic nail #3 and to S24, in which the reached point including around the point is defined as an S-side operation edge and the vehicle 10 is turned to the north and traveled straight toward the N-side operation edge.

Next the program proceeds to S26, in which it is determined whether the vehicle 10 has been traveled a distance defined in the operating program. When the result in S26 is affirmative, the program proceeds to S28, in which the vehicle 10 is turned to the south (toward the S-side operation edge). The foregoing operation is repeated so that the vehicle 10 is traveled along the designated travel route shown in FIG. 3.

Next the program proceeds to S30, in which it is determined whether the vehicle 10 has been traveled a defined distance. When the result in S30 is affirmative, it is determined that the vehicle 10 has passed another magnetic nail 66 designated by #4 in FIG. 3 or therearound and reached the vicinity of still another magnetic nail 66 designated by #5, and the program proceeds to S32, in which the magnetic nail #5 is searched through the processing of FIGS. 11 and 13.

Next the program proceeds to S34, in which it is confirmed that the vehicle 10 has reached (or passed) the right side of the magnetic nail #5 and to S36, in which the reached point including around the point is defined as a new S-side operation edge and the vehicle 10 is turned to the north (toward the N-side operation edge).

Then the program proceeds to S38, S40 and S42 to repeat the operation similarly to the above. When, in S44, it is discriminated that the vehicle 10 has reached an end point of the operating area 64 based on a value obtained by adding all the calculated traveled distances or the like, the program proceeds to S46, in which the vehicle 10 is returned to the charge ST 62 to finish its travel (operation).

As mentioned in the foregoing, in the control apparatus for an autonomous operating vehicle according to the first embodiment, it is configured to detect the primary reference direction and the position of the vehicle relative to magnetic nails 66 based on the output of the geomagnetic sensor having x-axis, y-axis and z-axis outputs, mounted on the vehicle 10 and responsive to the magnetic nails 66 embedded in the travel-scheduled area A and the map information, to calculate the traveling direction based on the output of the Yaw sensor 44 and the traveled distance based on the output of the wheel speed sensor 50, and to control the operation performed through the blades 20 in the travel-scheduled area A in accordance with the preset operation program based on the detected primary reference direction, the detected position of the vehicle in the travel-scheduled area A, the calculated traveling direction and the calculated traveled distance.

With this, it becomes possible to detect the border of the travel-scheduled area A and the position of the vehicle 10 in the travel-scheduled area A with the simple structure. As a result, when the (lawnmowing) operation using the blades 20 in the travel-scheduled area A is performed in accordance with the preset operation program, it makes possible to shorten the operating time and achieve the fine trace of the (lawnmowing) operation, thereby enhancing the operation performance.

Figure 14:
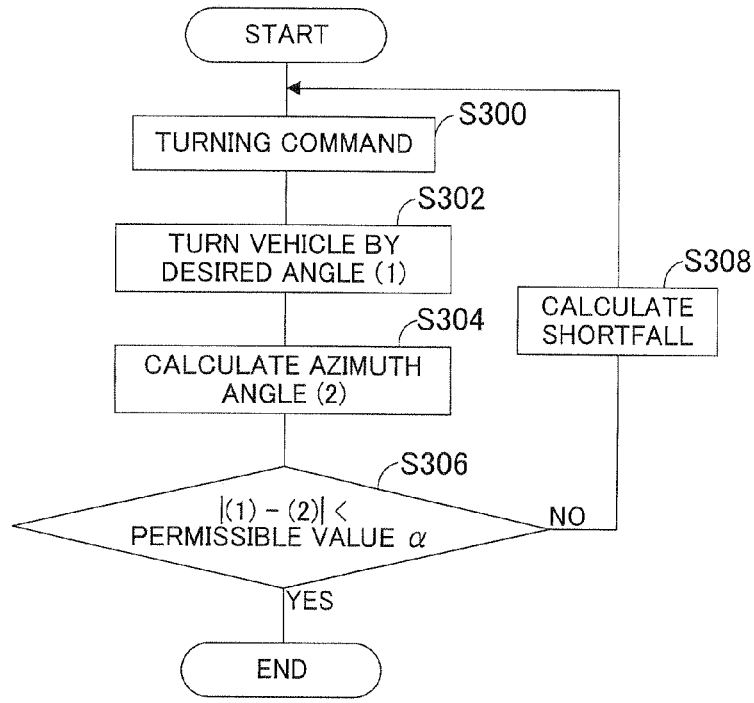
FIG. 14 is a flowchart showing the operation of a control apparatus for an autonomous operating vehicle according to a second embodiment of the invention.

FIG. 14 is a flowchart showing the operation of a control apparatus for an autonomous operating vehicle 10 according to a second embodiment of the invention.

The apparatus according to the second embodiment is configured so that, in the travel control of the vehicle 10, the ECU 40 corrects the traveling direction calculated based on the output of the Yaw sensor 44 with the primary reference direction detected through the processing of S104 in the FIG. 11 flowchart.

Specifically, since the travel-scheduled area A is not necessarily flat, i.e., could have uneven parts, slopes or slippery parts, and sampling time of the Yaw sensor outputs is limited, they may cause an error in the calculated traveling direction. The second embodiment is given to deal with it.

The program begins in S300, in which a turning command is sent to the motor 12 through the driver 12*a* and the program proceeds to S302, in which the vehicle 10 is turned by a desired angle (1) (e.g., 30 degrees).

Next the program proceeds to S304, in which an azimuth angle (2) of after the vehicle's turning, i.e., the angle of the vehicle 10 relative to the primary reference direction is calculated through the processing of S104 in the FIG. 11 flowchart.

Next the program proceeds to S306, in which it is determined whether a difference between the desired angle (1) and azimuth angle (2) is less than a permissible value α. When the result in S306 is affirmative, the remaining steps are skipped and when the result is negative, the program proceeds to S308, in which the shortfall is calculated and returns to S300 to correct the turning command value.

As mentioned in the foregoing, the second embodiment is configured to correct the traveling direction calculated based on the output of the Yaw sensor 44 with the primary reference direction detected through the processing of S104 in the FIG. 11 flowchart. With this, even when an error occurs in the traveling direction calculated based on the output of the Yaw sensor 44 due to uneven parts, slopes or slippery parts in the travel-scheduled area A, the limited sampling time of the sensor outputs, or the like, the error can be calibrated. Therefore, it becomes possible to control the travel of the vehicle 10 more appropriately, thereby further enhancing the operation performance. The remaining configuration as well as the effects is the same as in the first embodiment.

Figure 15:
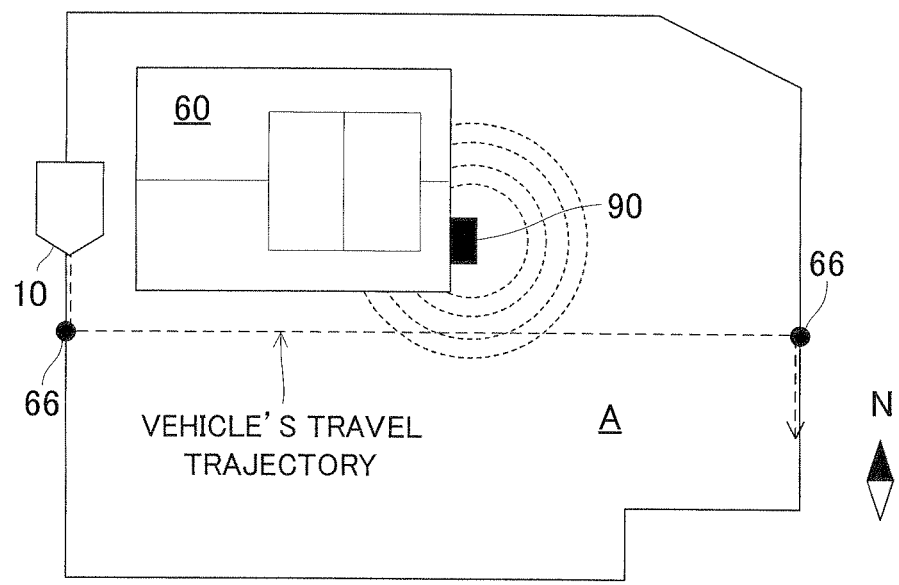
FIG. 15 is a plan view showing a travel-scheduled area in connection with a control apparatus for an autonomous operating vehicle according to a third embodiment of the invention.
Figure 16:
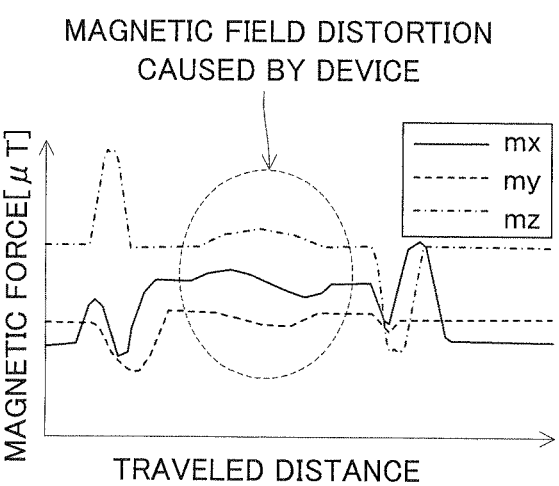
FIG. 16 is a waveform diagram similar to FIG. 4, but showing magnetic field distortion in outputs of the orientation sensor, which is caused by a device in the travel-scheduled area of FIG. 15.
Figure 17:
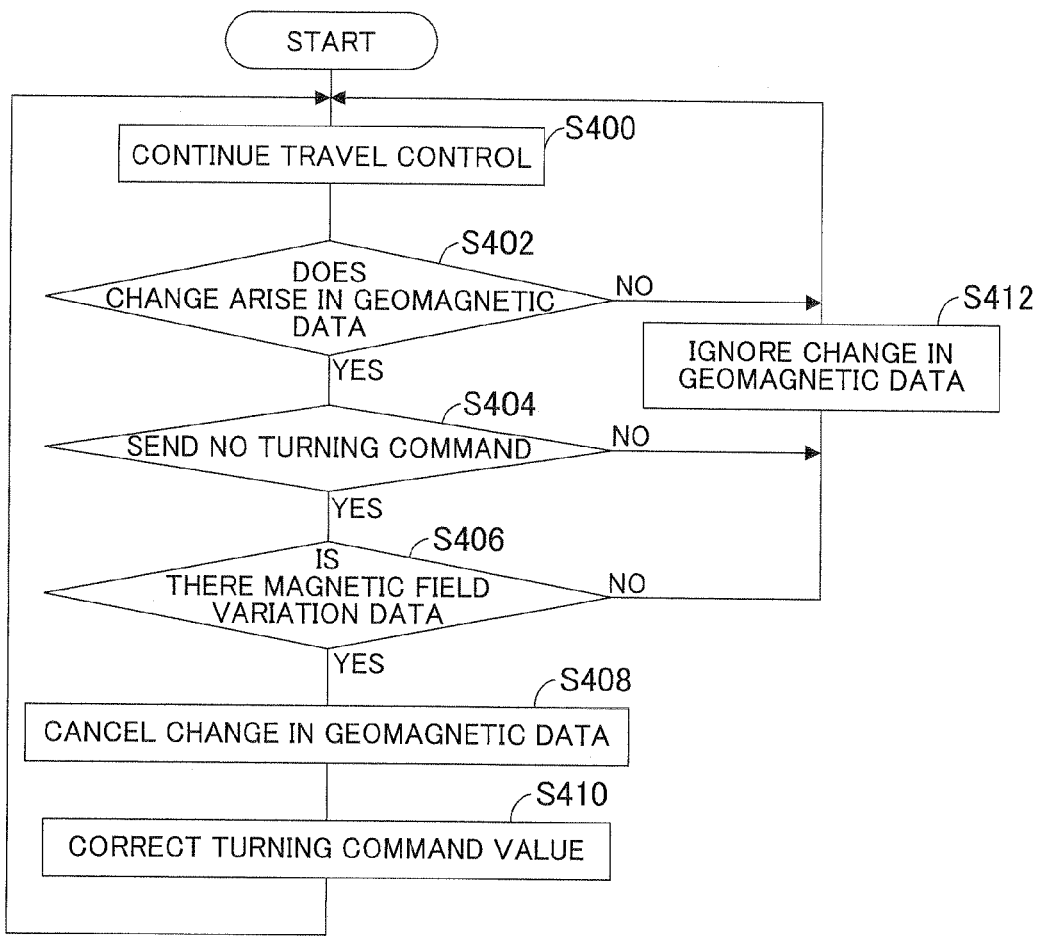
FIG. 17 is a flowchart showing the operation of the apparatus according to the third embodiment.

FIG. 15 is a plan view showing a travel-scheduled area in connection with a control apparatus for an autonomous operating vehicle according to a third embodiment of the invention, FIG. 16 is a waveform diagram similar to FIG. 4, but showing magnetic field distortion in outputs of the orientation sensor, which is caused by a device in the travel-scheduled area, and FIG. 17 is a flowchart showing the operation of the ECU 40 of the vehicle 10 according to the third embodiment.

As shown in FIG. 15, when a device 90 such as an outdoor unit of an air conditioner, which could cause magnetic field distortion, exists in the travel-scheduled area A, the output of the orientation sensor 42 is influenced thereby and distorted. The third embodiment is given to deal with it.

The explanation will be made with reference to FIG. 17. The program begins in S400, in which the travel (operation) of the vehicle 10 is continued and proceeds to S402, in which it is determined whether a change arises in geomagnetic data detected by the orientation sensor 42.

When the result in S402 is affirmative, the program proceeds to S404, in which it is determined whether no turning command is sent and when the result in S404 is affirmative, the program proceeds to S406, in which it is determined whether there is magnetic field variation data, i.e., whether a device 90 which could cause magnetic field distortion exists in the travel-scheduled area A.

When the result in S406 is affirmative, the program proceeds to S408, in which the change in the geomagnetic data is canceled (deleted) and to S410, in which a command value to be sent to the motor 12 for straight travel is corrected as necessary. When the result in S404 or S406 is negative, the program proceeds to S412, in which the geomagnetic data is ignored and the output of the orientation sensor 42 is directly applied.

As mentioned in the foregoing, the third embodiment is configured to detect the magnetic field variation in the travel-scheduled area A and correct a command value outputted for straight travel based on the detected magnetic field variation f. With this, in addition to the above effects, it becomes possible to avoid sending an erroneous command value and, therefore, further shorten the operating time and achieve the fine trace of the (lawnmowing) operation, thereby still further enhancing the operation performance. The remaining configuration as well as the effects is the same as in the first embodiment.

Figure 18:
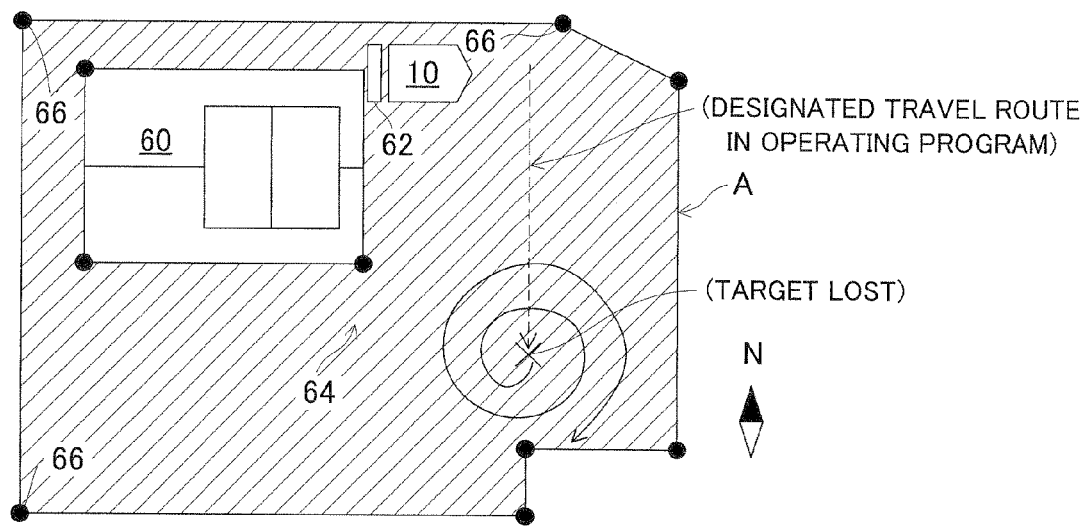
FIG. 18 is a plan view showing a travel-scheduled area in connection with a control apparatus for an autonomous operating vehicle according to a fourth embodiment of the invention.

FIG. 18 is a plan view showing a travel-scheduled area in connection with a control apparatus for an autonomous operating vehicle 10 according to a fourth embodiment of the invention.

In the fourth embodiment, in the case where it is not detected that the vehicle 10 has reached a target one of the magnetic nails 66 after traveling a defined distance to the target magnetic nail 66, based on the map information, the vehicle's travel is modified to the extent that the vehicle 10 does not deviate from the operating area 64.

For instance, as shown in FIG. 18, a command to the motor 12 is changed to make the vehicle 10 travel outward in concentric circles from its straight travel, thereby searching the target magnetic nail 66. After searching it, the position of the vehicle 10 is detected and the operation is continued.

If such the travel change is repeated, the operation is stopped and the vehicle 10 is returned to the charge ST 62. When a difference in the absolute position of the vehicle 10 occurs, the absolute position is corrected or calibrated and then the operation is resumed. In addition, the map information is corrected or calibrated as necessary.

As mentioned in the foregoing, the fourth embodiment is configured to, when the target magnet nail 66 can not be searched during the vehicle's straight travel, control the operation of the motor 12 to make the vehicle 10 turn or travel in circle. With this, in addition to the above effects, it becomes possible to reliably detect the position of the vehicle 10 relative to the magnet. The remaining configuration as well as the effects is the same as in the first embodiment.

Figure 19:
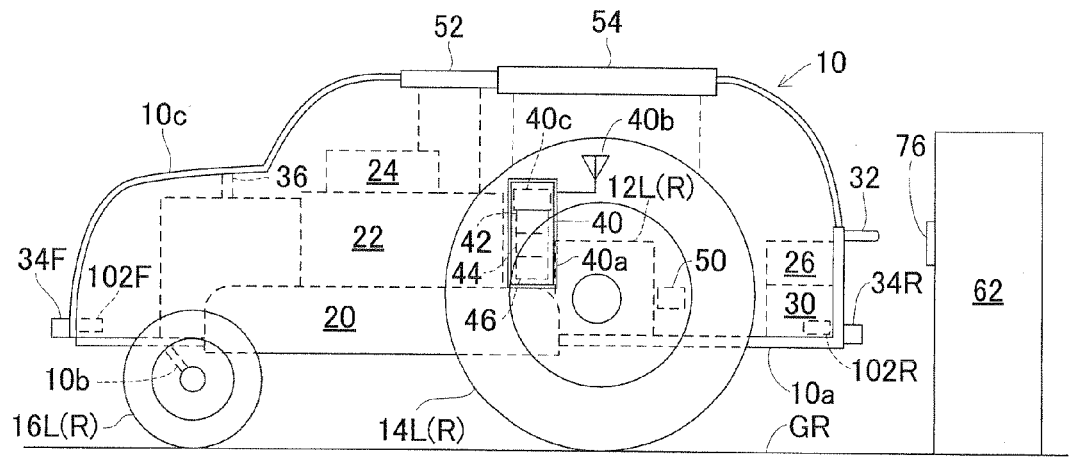
FIG. 19 is an overall schematic view of a control apparatus for an autonomous operating vehicle according to a fifth embodiment of the invention.
Figure 20:
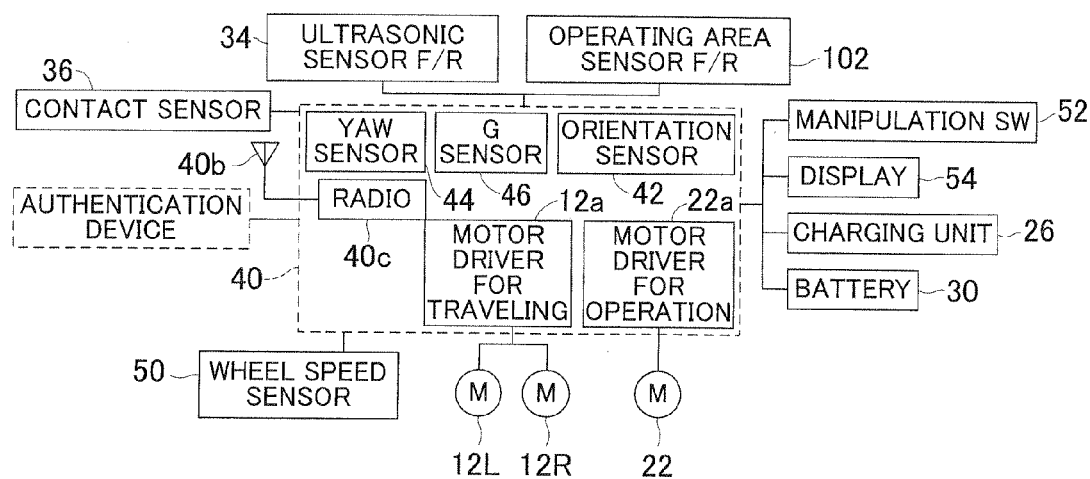
FIG. 20 is a block diagram showing input and output of sensors, etc., mounted on the vehicle shown in FIG. 19.
Figure 21:
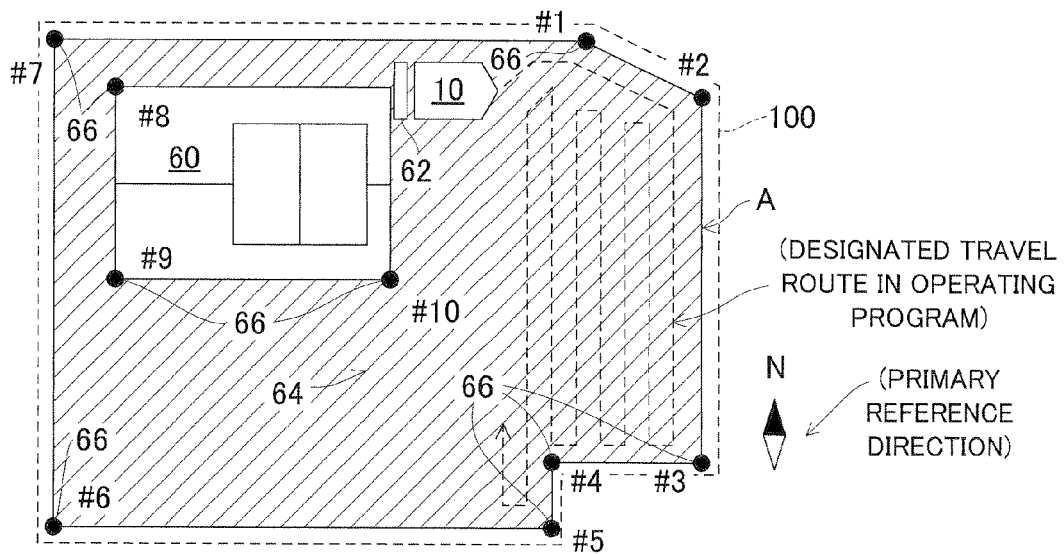
FIG. 21 is a plan view showing a travel-scheduled area in connection with the apparatus of the vehicle shown in FIG. 19.
Figure 22:
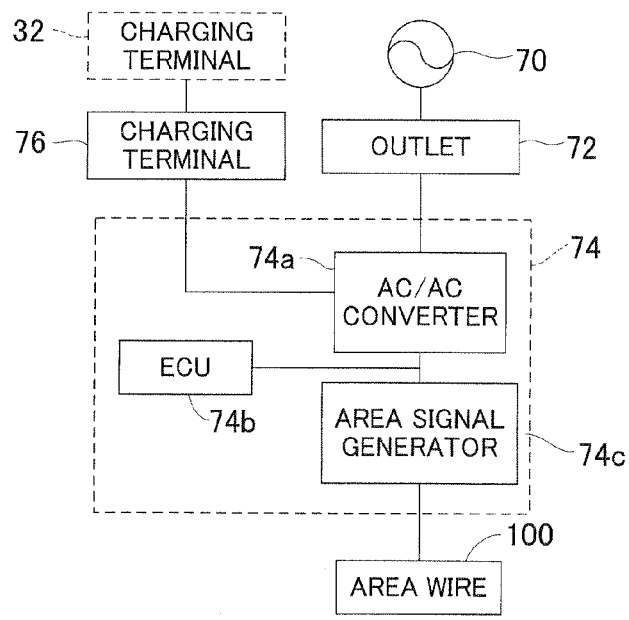
FIG. 22 is a block diagram showing the configuration of a charge station of the vehicle shown in FIG. 19.

FIG. 19 is an overall schematic view of a control apparatus for an autonomous operating vehicle 10 according to a fifth embodiment of the invention, FIG. 20 is a block diagram showing input and output of sensors, etc., mounted on the vehicle, FIG. 21 is a plan view showing the travel-scheduled area A where the vehicle 10 travels and FIG. 22 is a block diagram showing the configuration of a charge ST 62.

As shown in FIGS. 19 to 21, the fifth embodiment is configured to lay an area wire (electric wire) 100 along the border of the travel-scheduled area A and install operating area sensors (magnetic sensors) 102F, 102R at the front and rear of the vehicle 10 to detect magnetic field generated along the area wire 100 to recognize the border of the travel-scheduled area A using a known technique disclosed, for example, by '738.

As shown in FIG. 22, the charging device 74 of the charge ST 62 includes an area signal generator 74c. The area signal generator 74c supplies alternating current to the area wire 100 (i.e., generates an area signal).

As mentioned in the foregoing, since the fifth embodiment is configured to have the area wire 100 and operating area sensors 102, etc., it becomes possible to more reliably detect the border of the travel-scheduled area A. The remaining configuration as well as the effects is the same as in the first embodiment.

As stated above, in the first to fifth embodiments, it is configured to have an apparatus (ECU 40) and a method for controlling an autonomous operating vehicle (10) having a prime mover (electric motor 12), a driven wheel (14) connected to the prime mover and an operating machine (blades 20), the vehicle autonomously traveling in a travel-scheduled area (A) to perform operation using the operating machine by driving the prime mover, comprising: a geomagnetic sensor (orientation sensor 42) having x-axis, y-axis and z-axis outputs, mounted on the vehicle and responsive to a magnet (magnetic nails 66) embedded in the travel-scheduled area; an angular velocity sensor (Yaw sensor 44) adapted to detect angular velocity generated about z-axis in center of gravity of the vehicle; a wheel speed sensor (50) adapted to produce an output indicative of a wheel speed of the driven wheel of the vehicle; a map information storage (map information storing section 40d) adapted to define the travel-scheduled area and store map information including an embedded position of the magnet indicated with an x-y coordinate position; a primary reference direction and position detector (primary reference direction and position detecting section 40e, S12, S20, S32, S100 to S108, S200 to S206) adapted to detect a primary reference direction based on the output of the geomagnetic sensor, detect a position of the vehicle relative to the magnet based on the output of the geomagnetic sensor and detect a position of the vehicle in the travel-scheduled area based on the detected position and the map information; a direction and distance calculator (direction and distance calculating section 40f) adapted to calculate a traveling direction based on the output of the angular velocity sensor and calculate a traveled distance based on the output of the wheel speed sensor; and an operation controller (travel and operation controlling section 40g, S10 to S46) adapted to control the operation performed through the operating machine (blades 20) in the travel-scheduled area in accordance with a preset operation program based on the detected primary reference direction, the detected position of the vehicle in the travel-scheduled area, the calculated traveling direction and the calculated traveled distance.

With this, it becomes possible to detect the border of the travel-scheduled area A and the position of the vehicle 10 in the travel-scheduled area A with the simple structure. As a result, when the operation using the operating machine (blades 20) in the travel-scheduled area A is performed in accordance with the preset operation program, it makes possible to shorten the operating time and achieve the fine trace of the (lawnmowing) operation, thereby enhancing the operation performance.

In the apparatus and method, the primary reference direction and position detector (40e) compares the z-axis output of the geomagnetic sensor with a threshold value and detects one of the primary reference direction and the position of the vehicle relative to the magnet in accordance with a result of the comparing. With this, in addition to the above effect, it becomes possible to accurately detect the primary reference direction and the position of the vehicle 10 relative to the magnetic nail 66.

In the apparatus and method, the primary reference direction and position detector (40e) detects the position of the vehicle relative to the magnet based on the x-axis, y-axis and z-axis outputs of the geomagnetic sensor when the z-axis output of the geomagnetic sensor exceeds a threshold value (mzlmt). With this, in addition to the above effects, it becomes possible to more accurately detect the primary reference direction and the position of the vehicle 10 relative to the magnetic nail 66.

In the apparatus and method, the direction and distance calculator (400 corrects the calculated traveling direction based on the primary reference direction detected by the primary reference direction and position detector. With this, in addition to the above effects, even when an error occurs in the traveling direction calculated based on the output of the Yaw sensor 44 due to uneven parts, slopes or slippery parts in the travel-scheduled area A, the limited sampling time of the sensor outputs, or the like, the traveling direction can be corrected with the detected primary reference direction. Therefore, it becomes possible to control the travel of the vehicle 10 more appropriately, thereby further enhancing the operation performance.

In the apparatus and method, the travel and operation controller (40g) controls the prime mover to make straight travel in a direction of the primary reference direction detected by the primary reference direction and position detector when the operation is performed. With this, in addition to the above effects, when the operation using the blades 20 in the travel-scheduled area A is performed in accordance with the preset operation program, since the vehicle 10 is traveled straight in the primary reference direction direction, i.e., in the north-south direction, it makes possible to further shorten the operating time and achieve the fine trace of the (lawnmowing) operation, thereby further enhancing the operation performance.

In the apparatus and method, the primary reference direction and position detector (40e) includes a magnetic field variation detector (S406) adapted to detect variation in magnetic field in the travel-scheduled area and corrects a command value outputted for the straight travel based on the magnetic field variation. With this, in addition to the above effects, it becomes possible to avoid sending an erroneous command value and, therefore, further shorten the operating time and achieve the fine trace of the (lawnmowing) operation, thereby still further enhancing the operation performance.

In the apparatus and method, the travel and operation controller (40g) controls the prime mover to turn or travel the vehicle in circle when the magnet has not been searched during the straight travel. With this, in addition to the above effects, it becomes possible to reliably detect the position of the vehicle 10 relative to the magnetic nail 66.

In the apparatus and method, the prime mover comprises an electric motor, a charge station (62) is provided in the travel-scheduled area to charge the motor, and the charge station is defined as a reference position (origin) in the map information. With this, in addition to the above effects, it becomes possible to more accurately detect the position of the vehicle 10 in the travel-scheduled area A.

It should be noted that, in the foregoing, although the motor 12 is applied as the prime mover, it may be an internal combustion engine or another prime mover instead. Also, the blades 20 for mowing lawn are exemplified as the operating machine, but it should not be limited thereto. Further, other kinds of magnets can be utilized in place of the magnetic nails.

Japanese Patent Application No. 2010-222640, filed on Sep. 30, 2010 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an autonomous operating vehicle having a prime mover, a driven wheel connected to the prime mover and an operating machine, the vehicle autonomously traveling in a travel-scheduled area to perform operation using the operating machine by driving the prime mover, comprising:
    a geomagnetic sensor having x-axis, y-axis and z-axis outputs, mounted on the vehicle and responsive to a magnet embedded in the travel-scheduled area;
    an angular velocity sensor adapted to detect an angular velocity generated about z-axis that goes through a center of gravity of the vehicle and is perpendicular to a travel direction of the vehicle;
    a wheel speed sensor adapted to produce an output indicative of a wheel speed of the driven wheel of the vehicle;
    a map information storage adapted to define the travel-scheduled area and store map information including an embedded position of the magnet indicated with an x-y coordinate position;
    an absolute direction and position detector adapted to detect an absolute direction based on the output of the geomagnetic sensor, detect an approach direction to the magnet by comparing the output of the geomagnetic sensor with a pre-stored output pattern, and detect a position of the vehicle in the travel-scheduled area based on the detected approach direction and the map information;
    a direction and distance calculator adapted to calculate a traveling direction based on the output of the angular velocity sensor and a traveled distance based on the output of the wheel speed sensor; and
    an operation controller adapted to control the operation performed through the operating machine in the travel-scheduled area in accordance with a preset operation program based on the detected absolute direction, the detected position of the vehicle in the travel-scheduled area, the calculated traveling direction and the calculated traveled distance.

2. The apparatus according to claim 1, wherein the absolute direction and position detector compares the z-axis output of the geomagnetic sensor with a threshold value and detects one of the absolute direction and the position of the vehicle relative to the magnet in accordance with a result of the comparing.

3. The apparatus according to claim 2, wherein the absolute direction and position detector detects the position of the vehicle relative to the magnet based on the x-axis, y-axis and z-axis outputs of the geomagnetic sensor when the z-axis output of the geomagnetic sensor exceeds a threshold value.

4. The apparatus according to claim 1, wherein the direction and distance calculator corrects the calculated traveling direction based on the absolute direction detected by the absolute direction and position detector.

5. The apparatus according to claim 1, wherein the operation controller controls the prime mover to make straight travel in a direction of the absolute direction detected by the absolute direction and position detector when the operation is performed.

6. The apparatus according to claim 5, wherein the absolute direction and position detector includes a magnetic field variation detector adapted to detect variation in magnetic field in the travel-scheduled area and corrects a command value outputted for the straight travel based on the magnetic field variation.

7. The apparatus according to claim 5, wherein the operation controller controls the prime mover to turn the vehicle when the magnet is not detected after traveling a defined distance to the magnet in accordance with a preset operation program.

8. The apparatus according to claim 6, wherein the operation controller controls the prime mover to turn the vehicle when the magnet is not detected after traveling a defined distance to the magnet in accordance with a preset operation program.

9. The apparatus according to claim 1, wherein the prime mover comprises an electric motor, a charge station is provided in the travel-scheduled area to charge the motor, and the charge station is defined as a reference position in the map information.

10. An apparatus for controlling an autonomous operating vehicle having a prime mover, a driven wheel connected to the prime mover and an operating machine, the vehicle autonomously traveling in a travel-scheduled area to perform operation using the operating machine by driving the prime mover, the apparatus comprising:
    a geomagnetic sensor having x-axis, y-axis and z-axis outputs, mounted on the vehicle and responsive to a magnet embedded in the travel-scheduled area;
    an angular velocity sensor for detecting an angular velocity generated about z-axis that goes through a center of gravity of the vehicle and is perpendicular to a travel direction of the vehicle;
    a wheel speed sensor for producing an output indicative of a wheel speed of the driven wheel of the vehicle; and
    a map information storage for defining the travel-scheduled area and storing map information including an embedded position of the magnet indicated with an x-y coordinate position;
    at least one processor configured to:
    detect an absolute direction based on the output of the geomagnetic sensor;

detect an approach direction to the magnet by comparing the output of the geomagnetic sensor with a pre-stored output pattern;

detect a position of the vehicle in the travel-scheduled area based on the detected approach direction and the map information;

calculate a traveling direction based on the output of the angular velocity sensor and a traveled distance based on the output of the wheel speed sensor; and control the operation performed through the operating machine in the travel-scheduled area in accordance with a preset operation program based on the detected absolute direction, the detected position of the vehicle in the travel-scheduled area, the calculated traveling direction and the calculated traveled distance.

11. The apparatus according to claim 10, wherein the at least one professor is further configured to compare the z-axis output of the geomagnetic sensor with a threshold value and detect one of the absolute direction and the position of the vehicle relative to the magnet in accordance with a result of the comparing.

12. The apparatus according to claim 11, wherein the at least one processor is further configured to detect the position of the vehicle relative to the magnet based on the x-axis, y-axis and z-axis outputs of the geomagnetic sensor when the z-axis output of the geomagnetic sensor exceeds a threshold value.

13. The apparatus according to claim 10, wherein the at least one processor is further configured to correct the calculated traveling direction based on the detected absolute direction.

14. The apparatus according to claim 10, wherein the at least one processor is further configured to control the prime mover to make straight travel in a direction of the detected absolute direction when the operation is performed.

15. The apparatus according to claim 14, wherein the at least one professor is configured to detect a variation in magnetic field in the travel-scheduled area and correct a command value outputted for the straight travel based on the magnetic field variation.

16. The apparatus according to claim 14, wherein the at least one processor is configured to control the prime mover to turn the vehicle when the magnet is not detected after traveling a defined distance to the magnet in accordance with a preset operation program.

17. The apparatus according to claim 15, wherein the at least one processor is configured to control the prime mover to turn the vehicle when the magnet is not detected after traveling a defined distance to the magnet in accordance with a preset operation program.

18. The apparatus according to claim 10, wherein the prime mover comprises an electric motor, a charge station is provided in the travel-scheduled area to charge the motor, and the charge station is defined as a reference position in the map information.

19. A method for controlling an autonomous operating vehicle having a prime mover, a driven wheel connected to the prime mover and an operating machine, the vehicle autonomously traveling in a travel-scheduled area to perform operation using the operating machine by driving the prime mover, and further having a geomagnetic sensor having x-axis, y-axis and z-axis outputs, mounted on the vehicle and responsive to a magnet embedded in the travel-scheduled area, the method comprising:

obtaining a sensor output indicative of an angular velocity generated about z-axis that goes through a center of gravity of the vehicle and is perpendicular to a travel direction of the vehicle;

obtaining a sensor output indicative of a wheel speed of the driven wheel of the vehicle;

defining the travel-scheduled area and storing map information including an embedded position of the magnet indicated with an x-y coordinate position;

detecting an absolute direction based on the output of the geomagnetic sensor, an approach direction to the magnet by comparing the output of the geomagnetic sensor with a pre-stored output pattern, and a position of the vehicle in the travel-scheduled area based on the detected approach direction and the map information;

calculating, by a processor, a traveling direction based on the sensor output indicative of the angular velocity and a traveled distance based on the sensor output indicative of the wheel speed; and controlling, by the processor, the operation performed through the operating machine in the travel-scheduled area in accordance with a preset operation program based on the detected absolute direction, the detected position of the vehicle in the travel-scheduled area, the calculated traveling direction and the calculated traveled distance.

20. The method according to claim 19, wherein the detecting comprises comparing the z-axis output of the geomagnetic sensor with a threshold value and detecting one of the absolute direction and the position of the vehicle relative to the magnet in accordance with a result of the comparing.

21. The method according to claim 20, wherein the detecting comprises detecting the position of the vehicle relative to the magnet based on the x-axis, y-axis and z-axis outputs of the geomagnetic sensor when the z-axis output of the geomagnetic sensor exceeds a threshold value.

22. The method according to claim 19, wherein the calculating comprises correcting the calculated traveling direction based on the detected absolute direction.

23. The method according to claim 19, wherein the controlling comprises controlling the prime mover to make straight travel in a direction of the detected absolute direction when the operation is performed.

24. The method according to claim 23, wherein the detecting comprises detecting variation in magnetic field in the travel-scheduled area and correcting a command value outputted for the straight travel based on the magnetic field variation.

25. The method according to claim 23, wherein the controlling comprises controlling the prime mover to turn the vehicle when the magnet is not detected after traveling a defined distance to the magnet in accordance with a preset operation program.

26. The method according to claim 24, wherein the controlling compares controlling the prime mover to turn the vehicle when the magnet is not detected after traveling a defined distance to the magnet in accordance with a preset operation program.

27. The method according to claim 19, wherein the prime mover comprises an electric motor, a charge station is provided in the travel-scheduled area to charge the motor, and the charge station is defined as a reference position in the map information.

* * * * *

UNITED STATES PATENT AND TRADEMARK OFFICE
CERTIFICATE OF CORRECTION

Page 1 of 1

PATENT NO.         : 8,712,623 B2
APPLICATION NO.    : 13/240966
DATED              : April 29, 2014
INVENTOR(S)        : Kazuhisa Sato It is certified that error appears in the above-identified patent and that said Letters Patent is hereby corrected as shown below:

In the claims:

Column 15, line 17, Claim 11
--one professor is further-- should read as --one processor is further--

Column 15, line 37, Claim 15
--one professor is configured-- should read as --one processor is configured--

Signed and Sealed this
Ninth Day of September, 2014

Michelle K. Lee
*Deputy Director of the United States Patent and Trademark Office*